United States Patent [19]

Kuchel et al.

[11] Patent Number: 5,343,294

[45] Date of Patent: Aug. 30, 1994

[54] METHOD FOR ANALYZING PERIODIC BRIGHTNESS PATTERNS

[75] Inventors: Michael Kuchel, Oberkochen; Albrecht Hof, Aalen, both of Fed. Rep. of Germany

[73] Assignee: Carl-Zeiss-Stiftung, Heidenheim/Brenz, Fed. Rep. of Germany

[21] Appl. No.: 898,158

[22] Filed: Jun. 15, 1992

Related U.S. Application Data

[63] Continuation-in-part of Ser. No. 666,247, Mar. 8, 1991, Pat. No. 5,135,309, and a continuation-in-part of Ser. No. 666,363, Mar. 8, 1991, Pat. No. 5,135,308.

[51] Int. Cl.$^5$ .............................................. G01B 9/00
[52] U.S. Cl. .............................. 356/376; 250/237 G
[58] Field of Search ............... 356/376, 375, 347, 348, 356/353, 354, 359, 360; 250/237 G; 358/108

[56] References Cited

U.S. PATENT DOCUMENTS

| | | | |
|---|---|---|---|
| 3,627,427 | 12/1971 | Johnson | 356/376 |
| 4,488,172 | 12/1984 | Hutchin | 358/107 |
| 4,499,492 | 2/1985 | Hutchin | 358/107 |
| 4,564,295 | 1/1986 | Halioua | 356/376 |
| 4,641,972 | 2/1987 | Halioua et al. | 356/376 |
| 4,768,881 | 9/1988 | Juptner et al. | 356/347 |
| 4,984,893 | 1/1991 | Lange | 356/376 |
| 5,003,187 | 3/1991 | Zumbrunn et al. | 356/376 |
| 5,135,308 | 8/1992 | Kuchel | 356/376 |
| 5,135,309 | 8/1992 | Kuchel et al. | 356/376 |
| 5,202,749 | 4/1993 | Pfister | 356/376 |

FOREIGN PATENT DOCUMENTS

0379079 7/1990 European Pat. Off. .

OTHER PUBLICATIONS

Katherine Creath, "Comparison of Phase-Measurement Algorithms," Proceedings of the SPIE, vol. 680, 1986.
K. Kinnstaetter et al., "Accuracy of phase shifting interferometry", Applied Optics, vol. 27, No. 24, Dec. 15 1988, pp. 5082–5089.
A. J. Boehnlein et al., "Adaptation of a parallel architecture computer to phase shifted moire interferometry", SPIE, vol. 728, 1986, pp. 183–194.

Primary Examiner—Richard A. Rosenberger
Assistant Examiner—Hoa Q. Pham
Attorney, Agent, or Firm—Eugene Stephens & Associates

[57] ABSTRACT

The present invention relates to a method for evaluating fringe images, in particular, for topographic measurements. During a first step, several phase-displaced patterns are recorded sequentially in time, and the respective phase relations of these patterns are determined by evaluation in the spatial domain (14a, 14b, 15). During a second step, after the phase shifts have been determined accurately in this manner based on the video images themselves, a pixel-by-pixel evaluation of the phase-displaced pattern is performed in the time domain. The invention also includes computer hardware for performing the evaluation of the strip images in video real time.

16 Claims, 5 Drawing Sheets

METHOD FOR ANALYZING PERIODIC BRIGHTNESS PATTERNS

This application is a continuation-in-part of copending patent application Ser. No. 666,247 entitled METHOD AND APPARATUS FOR NON-CONTACT MEASURING OF OBJECT SURFACES by Kuchel and Hof, filed Mar. 8, 1991, now issued as U.S. Pat. No. 5,135,309; and is also a continuation-in-part of copending U.S. patent application Ser. No. 666,363 entitled METHOD AND APPARATUS FOR NON-CONTACT MEASURING OF OBJECT SURFACES by Kuchel, filed Mar. 8, 1991 now issued as U.S. Pat. No. 5,135,308.

FIELD OF INVENTION

The invention involves a method of analyzing periodic brightness patterns such as are used in interferometry and moire interferometry.

BACKGROUND

The present invention relates to a method for evaluating the phase relations of periodic brightness patterns, several of which are displaced relative to each other and are recorded by means of a camera. During one step, the phase relations of the patterns are determined separately for each individual image point corresponding to individual object points of the individual video images, and then the phase shift of the patterns is determined relative to an initial phase relation.

A way to do this has been suggested in U.S. Pat. No. 4,768,881, where two interferograms are recorded and their strip-like brightness patterns are shifted in phase relative to each other, and hence relative to the camera, by any fraction of a strip, i.e, $\alpha < \pi$. Spatial Fourier transformations are then used to compute—based on each recorded interferogram—the phase values associated with the object points and the phase shift between the two interferograms (evaluation in the spatial domain). The computed phase shift is used only to clearly determine the integral multiple of the number $2\pi$ of the computed phase values, i.e., the so-called phase unwrapping. In so doing, only the sign of the computed phase shift at the object point concerned is considered, while the value of the phase shift remains of no consequence during further evaluation.

A disadvantage of this method is the requirement that a phase shift smaller than $\pi$ must be established between the two recorded interferograms. Such a small phase shift can easily be caused by vibrations that can occur, for example, when the interferometer is used in a workshop. Then a reliable evaluation of the interferograms is no longer assured.

In addition, this method has the disadvantage that the phase value to be computed for one object point does not remain unaffected by the phase values of adjacent object points on account of the spatial Fourier transformation. The lateral measured resolution, i.e., the resolution in the camera image plane, therefore is lower than the lateral resolution of the camera position itself. This disadvantage exists for all analytical methods that consider the measured values in adjacent object points in addition to that measured in one object point for the computation of the phase value, because the spatial evaluation always acts as a low-pass filter.

The last-mentioned disadvantage has been eliminated in so-called phase displacement methods, where at least three phase-displaced brightness patterns are recorded sequentially and the phase value associated with one object point is computed from the brightness values of the phase-displaced brightness patterns in that object point (evaluation in the time domain). A few algorithms for analyzing such phase-displaced patterns are described in an article by K. Creath, "Comparison of phase measurement algorithms", *Proceedings of the SPIE*, Vol. 680 (1986).

Phase displacement methods also require that the values of the phase shifts between the patterns be very well known, because the accuracy of these values substantially determines the attainable measurement accuracy. To set the phase shifts precisely, the phase steps may be measured individually or a piezo-translator used for phase displacement may be calibrated accordingly. The Creath article also reveals that four phase-displaced brightness patterns permit the computation of the measured value of a phase shift, provided the phase displacement is always maintained at the same value.

Furthermore, *Applied Optics*, Vol. 27, 5082 (1988), discloses an iterative method for correcting individual phase steps when a phase displacement method is used. In this case the measured values of sequentially recorded interferograms are evaluated relative to two camera pixels that are in phase quadrature. Based on these measured values, a correction value for the voltage on a piezo-translator used for phase displacement is determined iteratively. The voltage on the piezo-translator is set so that the sum of all phase steps just result in $2\pi$ and the individual phase steps are equidistant.

An improved correction of the phase steps results when the computation of the correction value takes into consideration the measured values of several camera pixels. Upon having computed a correction value for two camera pixels in phase quadrature, the next correction values for the two adjacent camera pixels and then another correction value for the two camera pixels thereafter are computed. This procedure is repeated over an integral multiple of the fringe period. Such an improved correction value represents the mean value based on the individual correction values. In conjunction with this, however, it is again required that the two adjacent camera pixels be in phase quadrature, i.e., that the strip patterns have a spatial frequency relationship that changes only slightly, even over a plurality of camera pixels.

As explained above, all phase displacement methods require that the given phase steps be maintained with high accuracy and that the actual phase steps be accurately determined. Frequently, however, it is not possible to maintain the required accuracy of the phase steps because of the presence of vibrations, requiring complex mechanical damping measures. In this case even corrective measures, such as the highly complex ones described in *Applied Optics*, Vol. 27, 5082 (1988), fail because the piezo-translator is corrected before the actual topographic measurement is made. The measurement of the actual phase steps is made very complex because the phase steps must be measured with a degree of accuracy that corresponds to the desired measuring resolution of the interferometer.

The problems explained above occur not only in the evaluation of interferometric fringe images but also in the evaluation of topographic measurements using projected moire stripes. Corresponding methods of evaluating moire fringes are suggested in *SPIE*, vol. 728, 189 (1986), and in U.S. Pat. Nos. 4,488,172; 4,499,492; and 4,641,972. By these methods several stripe patterns with shifted phases are projected on the surface to be evaluated and an image of the projected pattern is recorded. Analogous to phase shift interferometry, the measured intensity values of the different images with shifted phases are used to reconstruct the surface topography at each image point of the camera. This also requires that the values of the phase steps be determined with high accuracy because erroneous phase steps result in erroneous measured values.

SUMMARY OF THE INVENTION

The present invention aims at evaluating brightness patterns with the maximum possible lateral resolution, in a reliable and accurate manner, even in the presence of external interferences such as vibrations. This problem has been solved in accordance with this invention by using phase shifts discretely determined for individual image points in a first method step to determine the phase relations of the patterns in the individual image points based on at least three patterns which are shifted relative to each other. Such pixel-based evaluation of at least three images during the second method step assures high lateral resolution, because the phase relations of the patterns so determined are completely different from the phase relations of the patterns in adjacent camera-based pixels. Therefore, there is no low-pass filtering.

Viewed by itself, the second method step has been known from the cited literature references. But the present invention, although using a step that is known per se, uses the separate evaluation of the individual patterns (evaluation in the spatial domain) to determine the phase relation of phase-displaced patterns relative to each other or relative to a pre-given initial phase relation in an accurate and reliable manner from the recorded images themselves in order to perform—based on these findings—a high lateral resolution evaluation based on the phase displacement method (evaluation in the time domain). Consequently, the value of the actual phase shift is known at all times, even though subject to external interferences, e.g., vibrations, after performing the first method step. Certain values or a certain range of values regarding the phase steps need not be maintained, and the phase steps may certainly assume stochastic values. Therefore, the inventive method is highly reliable even when employed in factory or production environments where vibration is significant.

While the known methods for the separate evaluation of individual patterns, such as disclosed by U.S. Pat. No. 4,768,881, always require the computation of the integral multiple of $2\pi$ each object point, this type of tedious phase unwrapping is not required during the first method step. In order to perform the second method step, it is sufficient that the values of the phase steps (modulo $2\pi$) be known. The accuracy with which these phase steps are determined during the first method step is not a function of the values of these phase steps themselves. These phase steps may readily have values that are greater than $\pi$ Calibrated high-accuracy translators therefore are not required to move the patterns.

The evaluation of the patterns during the first method step produces the values of the phase steps as a function of the lateral spatial coordinates of the camera images. Therefore, it is possible even during the second method step to consider phase steps which are a function of the lateral spatial coordinates. Such location-dependent phase steps may occur, for example, in phase shift interferometry by tilting the reference mirrors. Therefore, in order to determine the phase shift, the global phase relations are approximated by mathematical functions. Such an approximation corresponds to spatial averaging of the phase steps.

However, it is advantageous, particularly for applications where such location-based phase steps are of only subordinate importance, to subtract from each other the computer phase values of different camera images at corresponding object points and to average these differences over a plurality of object points. By averaging in this manner, the statistical errors inherent in the values of the phase steps can be reduced by the factor $1/\sqrt{n}$, wherein n represents the number of averaged differences.

The determination of the phase relation of the brightness pattern during the first method step takes place advantageously by convoluting the measured intensity values by means of a two-dimensional convolution function. Such convolution algorithms have been disclosed, for example, in German Patent Application P 40 14 019.9, a copy of which has been enclosed.

When using the method for topographic measurements by means of a projected brightness pattern, it is advantageous if both patterns having the same spatial period are projected at angles inclined relative to each other so as to generate the differences in the phase values of the patterns. The generation of these differences results in a beat frequency with a phase relation independent of the relative phase relation of the pattern. Therefore, the phase relation of this beat frequency does not change during a phase shift of the individual patterns as long as the phase steps for the patterns projected at an angle relative to each other remain the same. From a technical viewpoint, this can be implemented easily in that two projection grids having the same periods are mounted to the same grid support, which is shifted to shift the phases. If a total of three patterns having the same spatial periods are projected at different angles of inclination, two beat frequencies may be generated by determining the differences among the determined phase values, whereby the unambiguity range of the measurement is widened distinctly.

The inventive method may be carried out with an appropriately programmed computer. However, in order to attain short evaluation times, it is useful to provide special analytical computing hardware. However, such an analytical computer should contain separate circuit systems for the computation of the phase relations during the first method step and the computation of the phase relations during the second method step. Inasmuch as performing the second method steps requires the result of the first method step, an additional storage should be provided for storing the respective camera image of the brightness pattern.

The circuit system for the determination of the phase relation, as well as the generation of the difference of the phase relations of the patterns, are advantageously composed of image storages, look-up tables, and arithmetic logic units. This permits an evaluation in video real time. The evaluation of the phase relations of the patterns which have been projected in an inclined manner may be parallel processed in order to assure short evaluation times. If several patterns projected at an angle relative to each other are recorded, a separate circuit system for each pattern should be provided for computing the phase relation during the second method step so that the evaluation of the different patterns is parallel and hence rapid.

The system for averaging the phase differences consists advantageously at least in part of hardware. Only when the number of averaged differences fluctuates from one camera image to the next is it advantageous to perform a division by the number of averaged differences in the computer which controls the measuring process. A fluctuating number of averaged differences results at all times when a mask is used for masking invalid measured values and therefore excluding them from further consideration.

DRAWINGS

The drawings showing specific features of the present invention are explained in detail hereinafter. Generally, they show.

DETAILED DESCRIPTION

Figure 1:
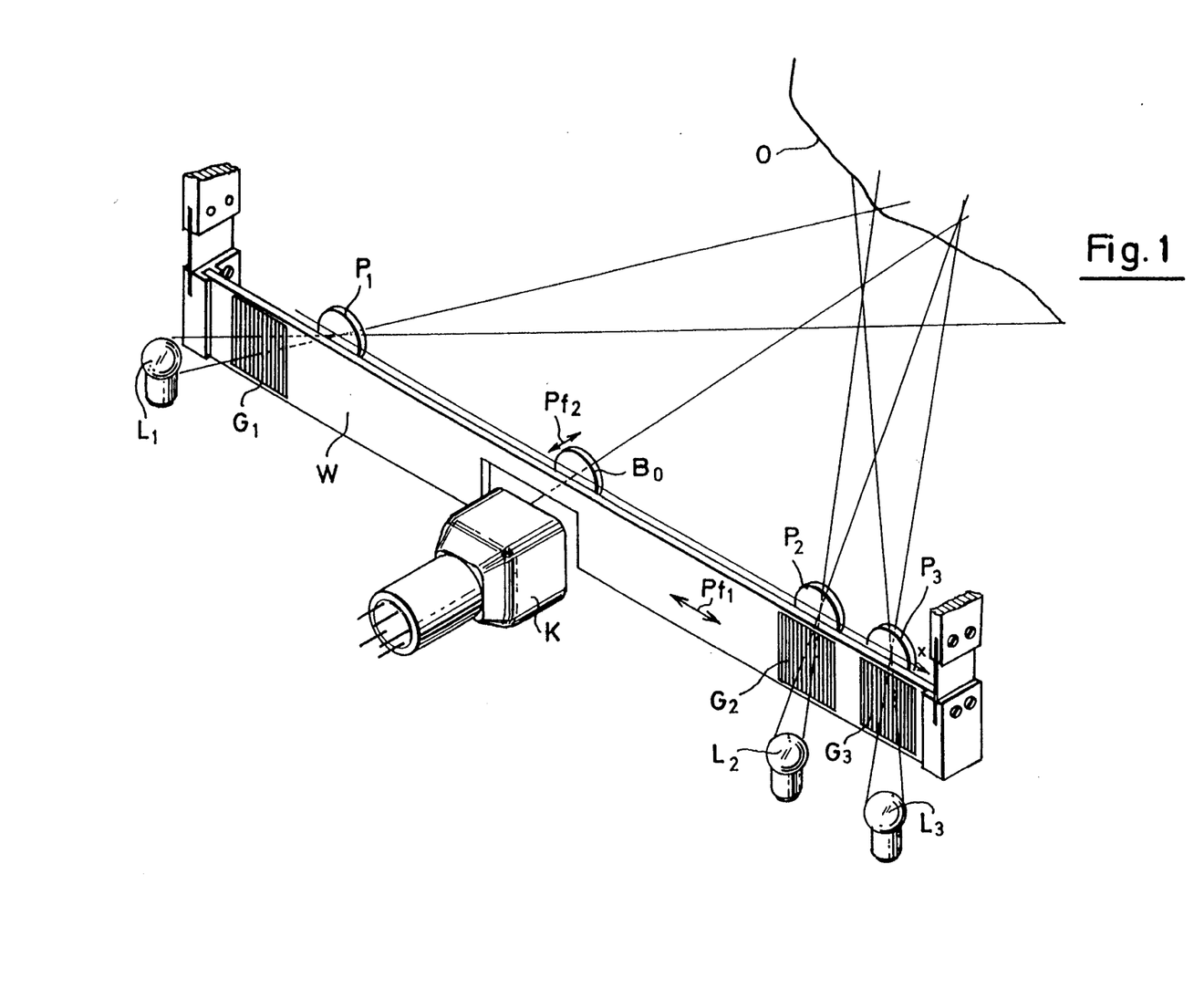
FIG. 1 is a perspective illustration of a system for strip projection.
Figure 2:
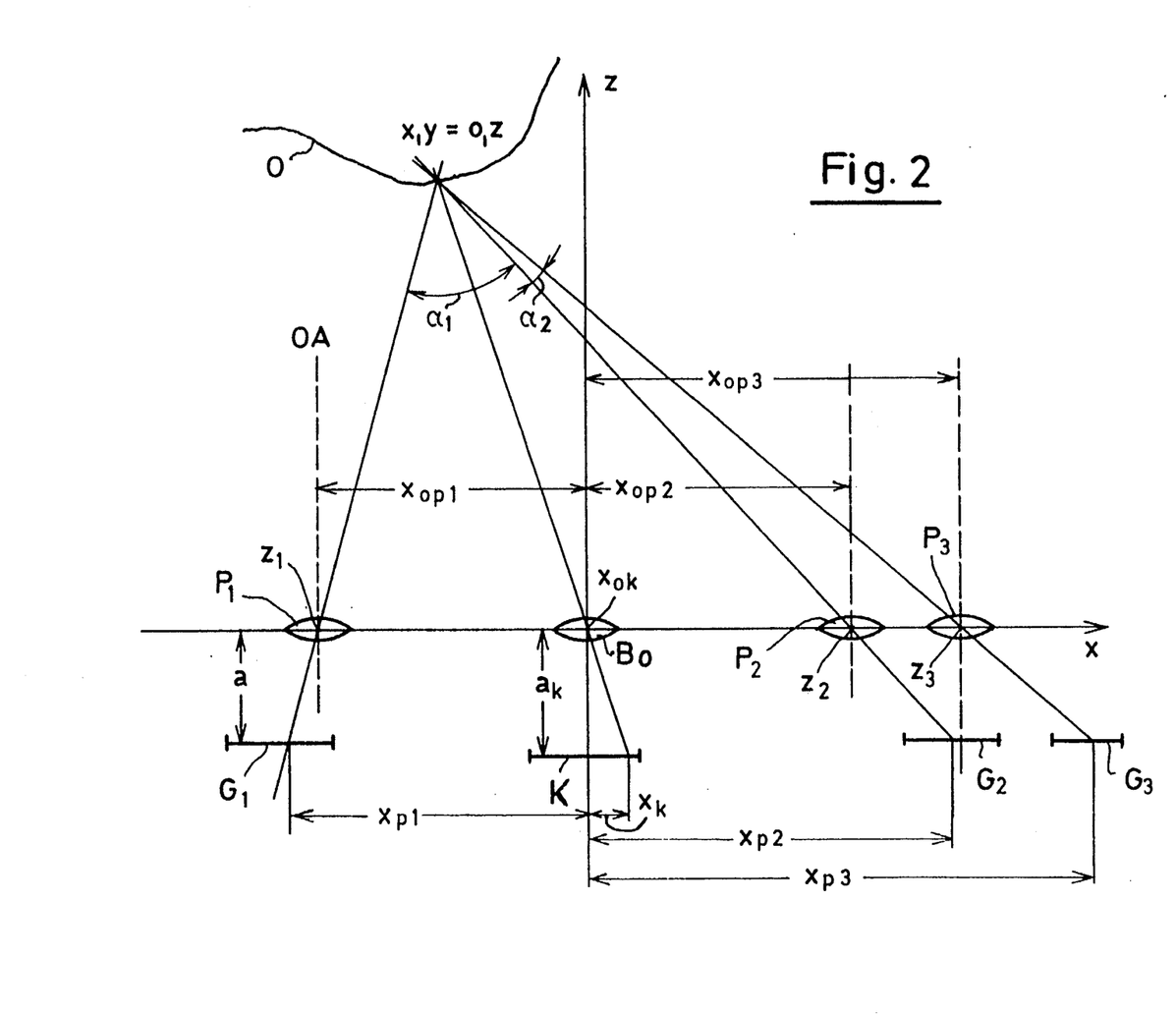
FIG. 2 is a block diagram illustrating the optical system of the strip projector of FIG. 1.

FIGS. 1 and 2 show a system that essentially consists of three projectors with optical projection systems ($P_1$, $P_2$, and $P_3$) and three grids ($G_1$, $G_2$, and $G_3$), each having the same grid period, as well as three flash lamps ($L_1$, $L_2$, and $L_3$). The camera sensor (K) records grating pattern images that have been projected by the projectors ($P_1$, $P_2$, and $P_3$) and deformed by the object surface (O). The three grids or gratings ($G_1$, $G_2$, and $G_3$) preferably have cosinusoidal transmission characteristics. While the projectors ($P_1$ and $P_2$) are inclined at a relatively large angle ($\alpha_1$) of approximately 30° relative to each other, the two adjacent projectors ($P_2$ and $P_3$) subtend a relatively small angle ($\alpha_2$) of, e.g., 0.5°. This small angle ($\alpha_2$) which is effective in the drawing plane may be realized in that the projector ($P_2$) generating the grating ($G_2$) is located above the drawing plane and the projector ($P_3$) generating the grating ($G_3$) is located beneath the drawing plane. Inasmuch as a shifting of the projectors and the gratings parallel to the divisions of the gratings does not affect the evaluation of the images recorded by the camera (K), the diagram of FIG. 2 shows the system with its projection centers ($Z_1$, $Z_2$, and $Z_3$) arranged in a straight line to simplify the illustration.

By this arrangement, two sets of planes exhibiting constant phase differences can be defined, i.e., the phase differences of the grating patterns of the two projectors ($P_1$ and $P_2$), as well as the phase differences of the two grating patterns of the projectors ($P_2$ and $P_3$), whereby successive surfaces having the same phase differences can be associated with different effective wavelengths ($\lambda$ eff) in z-direction. The effective wavelength ($\lambda$ eff) is determined by the periods of the gratings ($G_1$, $G_2$, and $G_3$) and the angles ($\alpha_1$) and ($\alpha_2$), between the respective projection axes of the projectors, and therefore becomes only a function of the angles ($\alpha_1$ and $\alpha_2$) because the periods of the gratings ($G_1$ through $G_3$) are the same.

Hereinafter are derivations of formulae from which the object coordinates (x, y, and z) of the strip patterns projected by the three projectors ($P_1$, $P_2$, and $P_3$) can be computed for the individual points of the object surface.

This requires that the centers of projection ($Z_1$, $Z_2$, and $Z_3$) of the projection lenses be located on one straight line in x-direction and the three gratings ($G_1$ through $G_3$) be positioned at the same distance (a) behind the straight line. The gratings are mounted, for example, on one support (W) consisting of glass or a material having a low coefficient of thermal expansion such as, for example, "Zerodur", and may be moved completely and without play with the aid of a counter-spring in order to move the patterns together relative to the CCD camera (K) in the direction of the straight line (x). Also, the projectors ($P_1$, $P_2$, and $P_3$) are mounted on one support (not shown in FIG. 1) which preferably consists of the same material as the support (W) for the gratings. Sufficient thermal conduction between the two supports is preferably assured so that the temperature gradient between the two is minimal, to reduce the influence of the ambient temperature on the measuring accuracy. The photosensitive part of the camera, i.e., the CCD sensor, is mounted at a distance ($a_k$) behind the viewing lens ($B_0$).

This arrangement essentially defines the geometric configuration of the measuring apparatus. For example, the projected grid or grating locations ($x_{p1}$, $x_{p2}$, $x_{p3}$) projected on any given point (x, y=0, z) are viewed with a video camera, e.g., a CCD camera. The center ($x_{0k}$) of the viewing lens ($B_0$) of the camera determines the origin of the system of coordinates of the projectors ($P_1$ through $P_3$).

By considering similar triangles, the following are obtained for the projectors $$\frac{x_{p1} - x_{op1}}{a} = \frac{x - x_{op1}}{z} \qquad (1)$$

$$\frac{x_{p2} - x_{op2}}{a} = \frac{x - x_{op2}}{z} \qquad (2)$$

$$\frac{x_{p3} - x_{op3}}{a} = \frac{x - x_{op3}}{z} \qquad (3)$$

and for the camera $$\frac{x_k}{a_k} = \frac{x}{z} \qquad (4)$$

The combination of the camera equation (4) with the projector equations (1–4) results in $$z = \frac{x_{op1} \cdot a}{(n_1 + \delta_1) P + x_k \frac{a}{a_k}} \qquad (5)$$

$$z = \frac{x_{op2} \cdot a}{(n_2 + \delta_2) P + x_k \frac{a}{a_k}} \qquad (6)$$

$$z = \frac{x_{op3} \cdot a}{(n_3 + \delta_3) P + x_k \frac{a}{a_k}} \qquad (7)$$

whereby the differences ($x_{opi} - x_{xpi}$, i=1..3) are expressed as $n_i + \delta_1$) times the grating period (P), with ($n_i$) being an element of the natural numbers, and ($\delta_1 < 1$).

Considering the connection between the viewed grating patterns of two projectors and generating the differences, (5), (6), and (7) result in $$z = \frac{(x_{op1} - x_{op2}) \cdot a}{(n_1 - n_2 + \delta_1 - \delta_2) P} \quad (8)$$

$$z = \frac{(x_{op1} - x_{op3}) \cdot a}{(n_1 - n_3 + \delta_1 - \delta_3) P} \quad (9)$$

$$z = \frac{(x_{op2} - x_{op3}) \cdot a}{(n_2 - n_3 + \delta_2 - \delta_3) P} \quad (10)$$

or $$z = \frac{K_1}{N_1 - \Delta_1} \quad (11)$$

$$z = \frac{K_2}{N_2 - \Delta_2} \quad (12)$$

$$z = \frac{K_3}{N_3 - \Delta_3} \quad (13)$$

whereby $K_1, K_2, K_3$ are apparatus constants,
$N_1 = n_1 - n_2$, $N_2 = n_1 - n_3$, $N_3 = n_2 - n_3$ and
$\Delta_1 = \delta_1 - \delta_2$, $\Delta_2 = \delta_1 - \delta_3$, $\Delta_3 = \delta_2 - \delta_3$.

Formulae (11), (12), and (13) describe planes exhibiting constant phase differences ($N_i - \Delta_i$) between two projections each, which are parallel to the x/y plane. They do not depend on the point of observation (xk, yk) on the camera. For measurement, the integers ($N_1$, $N_2$, $N_3$) and the fractions ($\Delta_1$, $\Delta_2$, $\Delta_3$) must be determined.

Areas having the same phase differences expressed by equations (11), (12), and (13) can be associated with different effective wavelengths ($\lambda$eff) of the phase differences. The equation (11) obtained from a combination of the projectors ($P_1$ and $P_2$) and the equation (12) obtained from a combination of the projectors ($P_1$ and $P_3$) both involve relatively short effective wavelengths, while the equation (13) obtained from a combination of the two projectors ($P_2$ and $P_3$) involves a relatively long effective wavelength ($\lambda$eff). It is important that the different effective wavelengths can be controlled among the projectors in a highly stable manner via the angles ($\alpha_1$ and $\alpha_2$).

For a computer to be able to analyze the measurements, the formulae (11, 12, and 13) must be re-formed yet again $$z = \frac{K_1}{\text{int}\left(\frac{K_1}{K_3} N_3 + \frac{K_1}{K_3} \Delta_3 - \Delta_1\right) + \Delta_1} \quad (14)$$

$$z = \frac{K_2}{\text{int}\left(\frac{K_2}{K_3} N_3 + \frac{K_2}{K_3} \Delta_3 - \Delta_2\right) + \Delta_2} \quad (15)$$

To determine the coordinates (x, y, and z) of an image point completely, the lateral coordinates (x and y) are computed by means of Abbe's law of imagery as follows $$x = \frac{x_k}{a_k} \cdot z \quad (16)$$

$$y = \frac{y_k}{a_k} \cdot z \quad (17)$$

Figure 3A:
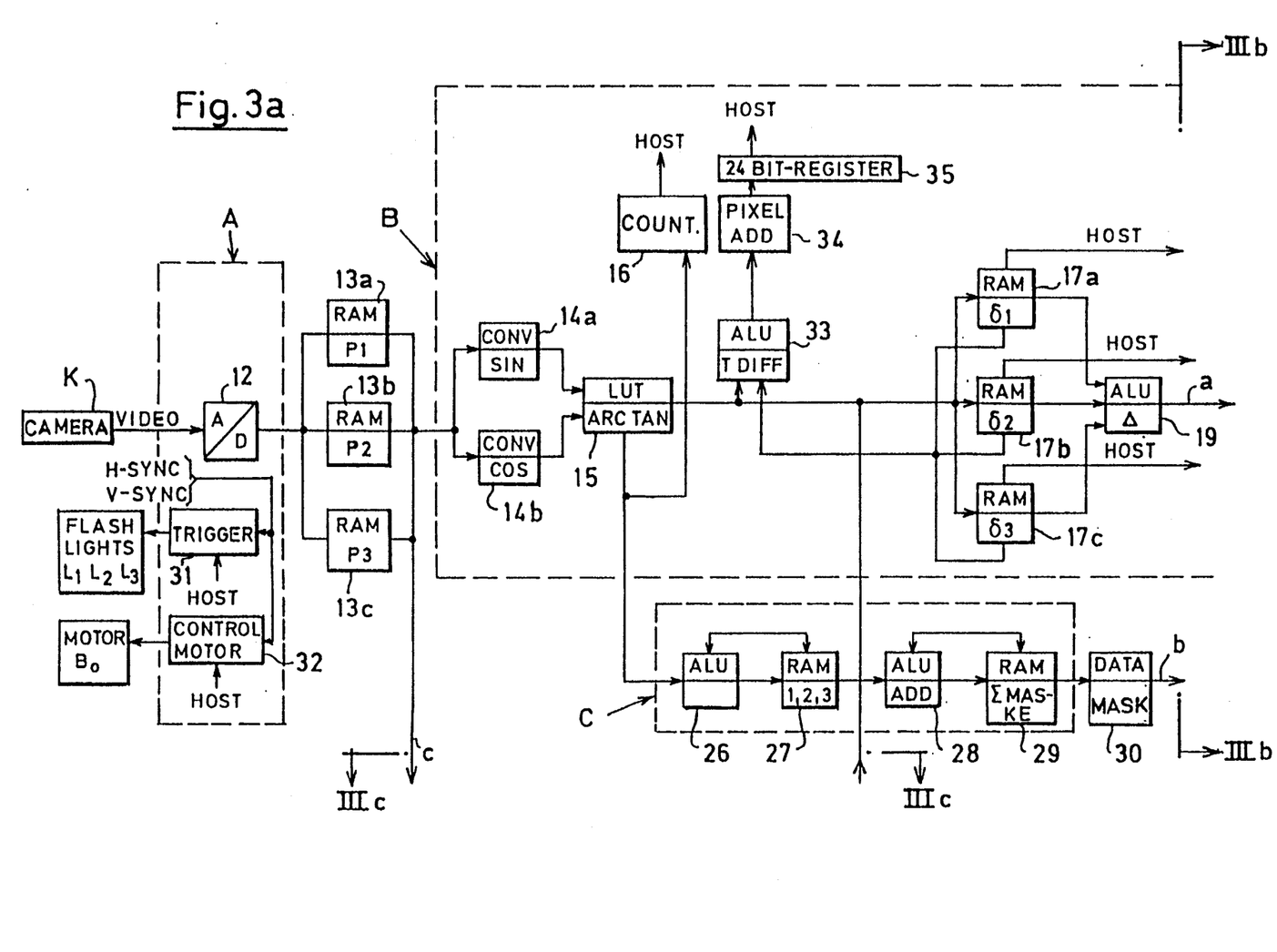
FIGS. 3a-c are subdivided circuit diagrams of the analytical computer used for analyzing the signals from the system shown by FIGS. 1 and 2.
Figure 3B:
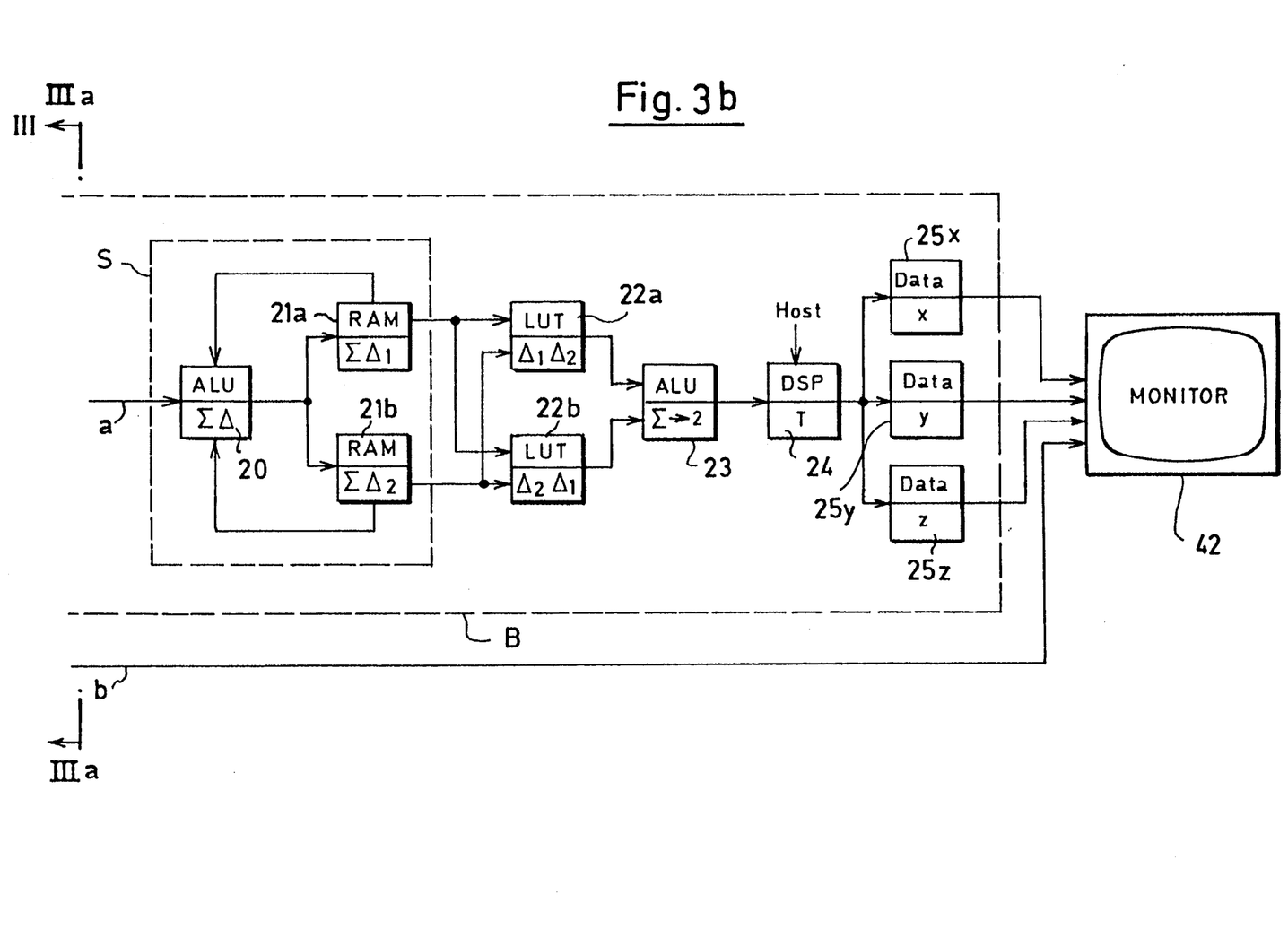
Figure 3C:
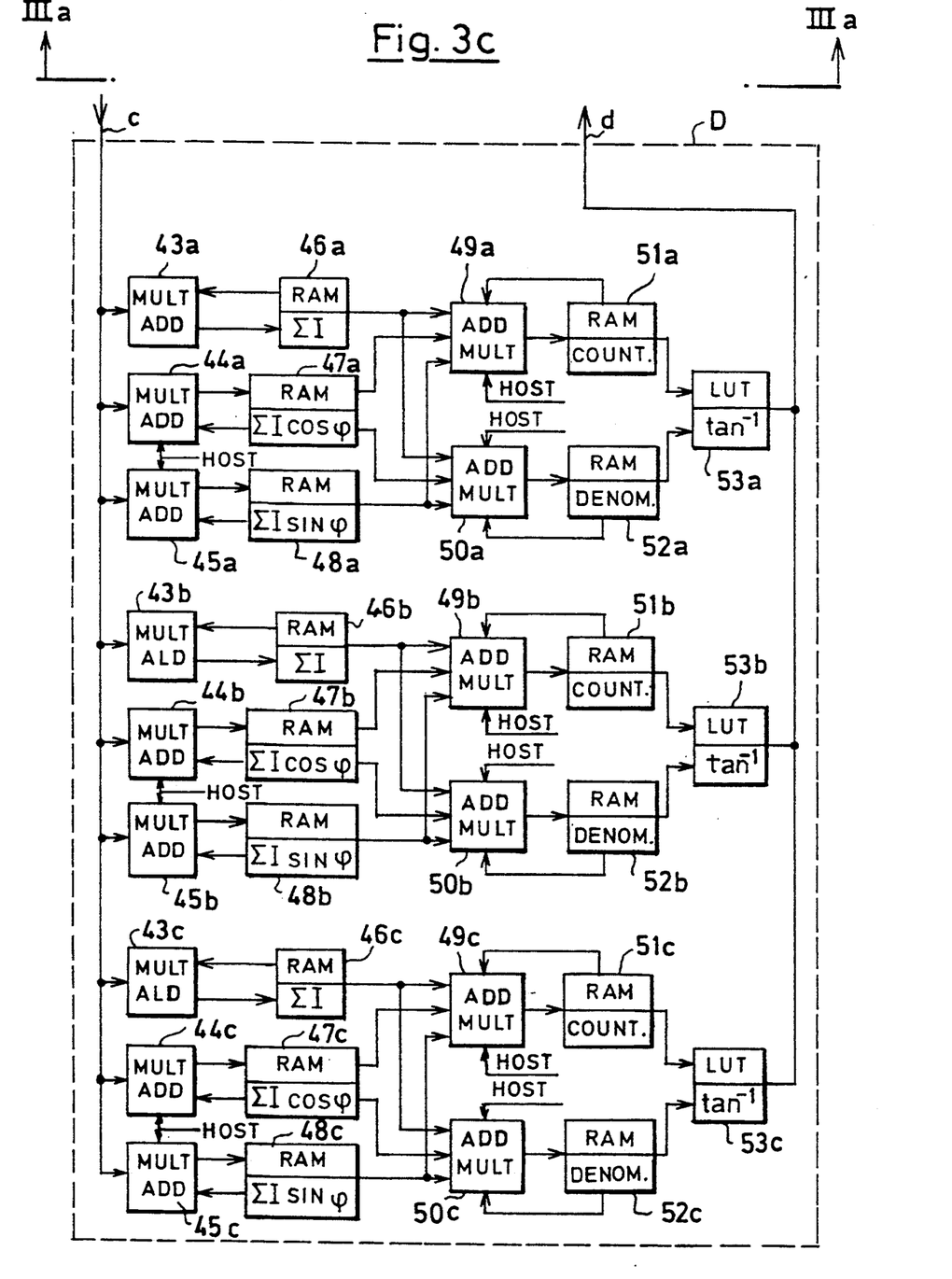

To analyze the fringes, the grating patterns projected onto the object by the three projectors ($P_1$ through $P_3$) are recorded by the camera (K) through the lens ($B_0$) by time-division multiplexing and are read into different image storages. The computation of the object coordinates (x, y, and z) in accordance with the above formulae takes place as described hereinafter in an image-processing computer as shown by FIGS. 3a–3c. This computer processes the image data in video real time. For this purpose, it is set up with a pipeline structure with partially parallel data paths and is preferably controlled by a Neumann host, i.e., for example, a commercially available process computer. For additional details of the analytical computer, see the block circuit diagrams of FIGS. 3a–3c.

These diagrams show four different function modules (A, B, C, and D). Function module (A) represents the interface with the external sensors and the controlling elements of the device, and it comprises an A/D converter (12) which digitizes the signal of the video camera (K) in video real time. To activate the flash lamps ($L_1$ through $L_3$), the interface card (A) uses a trigger circuit (31), which is synchronized with the camera (K). The interface module card (A), in addition, carries the electronic control (32) for the motor with which the lens ($B_0$) of the camera (K) can be focused on different object areas, as indicated by the arrow ($Pf_2$) in FIG. 1. The sequence of flashes and the setting of the lens is controlled by a standard measuring program of the conventional host computer (which is not illustrated in FIGS. 3a–3c). This is symbolized by the two arrows "Host", which occur also at other points of the circuit illustrated in FIGS. 3a, 3b, and 3c.

The digitized video signal that leaves the A/D converter (12) is stored in one of three image storages (13a–c), depending on which of the three patterns is projected at a time. Simultaneously, the digitized video signal is fed to the inputs of two parallel-connected convolution components (14a and 14b) in the function module (B). These two components (14a and 14b) perform a convolution operation to determine the sine or cosine value of the fringe phase at the individual object points from the measured values in the environment of these object points. Appropriate algorithms are described in the enclosed German Patent Application P 40 14 019.9.

The outputs of the components (14a, 14b) are fed to a circuit (15) where the fringe phase is determined based on the sine and cosine values. For this, a table associated with the circuit (15) contains the arc tangent function. At the same time, invalid measured values are superimposed on the phase values computed in the circuit (15). The invalid measured values are those which were obtained either with too high or too low an illumination intensity and therefore have a level above or below a preset limit. The mask for these two image areas is generated, in parallel to the measured data current, in the circuit element (C) as will be described hereinafter. A counter (16) counts the number of valid measured points per video image.

The output of the circuit (15) is fed to three parallel-connected image storages (17a–c), which temporarily store the phase values ($\delta_1$, $\delta_2$, and $\delta_3$). Parallel to the image storages (17a–c) is an arithmetic logic unit (ALU) (33) acting as subtractor. This ALU (33) generates the difference between the actual phase value computed by the circuit (15) and the phase value stored previously in one of the image storages (17a–c) and associated with a pattern having a displaced phase. For this purpose, the respective image storage (17a-c) is read out again just before the actual phase value is read in. The subtractor output is fed to an adder (34) which adds the differences of the phase values associated with the valid measured values and files the sum in a register (35). The host computer, which generates a quotient based on the sum stored in the register (35) and the number of valid measured values, can access this register (35), as well as the counter (16). This quotient represents a highly accurate mean value of the relative phase steps between successive images. The total phase shift ($\psi_i$) associated with the first image results from the summation of the relative phase steps.

The video images that are stored in the image storages (13a-c) are fed via a data path (c) to another function module (D) (see FIG. 3c) which computes the phase relation ($\delta$) of the fringes of several phase-displaced patterns. This function module (D) consists of three parallel-connected identical subgroups. All the reference numbers of the first subgroup are marked (a), and this subgroup processes the video images that are stored temporarily in the image storage (13a). The corresponding reference numbers of the two other subgroups are marked (b) and (c), respectively, depending on whether they are processing video images temporarily stored in the image storages (13b or 13c). This means that each projector ($P_1$, $P_2$, $P_3$) and consequently each projected pattern has its own processor subgroup.

Each of these subgroups performs a correction computation expressed as $$\delta = \arctan \frac{-k_1 l_1 + k_2 l_2 - k_3 l_3}{k_1 m_1 - k_2 l_3 + k_3 m_3} \quad (18)$$

for each camera pixel, whereby $$k_1 = \sum_{i=1}^{N} I_i$$

$$k_2 = \sum_{i=1}^{N} I_i \sin\phi i$$

$$k_3 = \sum_{i=1}^{N} I_i \cos\phi i$$

$$l_1 = \sum_{i=1}^{N} \sin\phi i \sum_{i=1}^{N} \cos^2\phi i - \sum_{i=1}^{N} \cos\phi i \sum_{i=1}^{N} (\sin\phi i \cos\phi i)$$

$$l_2 = N \sum_{i=1}^{N} \cos^2\phi i - \left(\sum_{i}^{N} \cos\phi i^2\right)$$

$$l_3 = N \sum_{i=1}^{N} (\sin\phi i \cos\phi i) - \sum_{i=1}^{N} \cos\phi i \sum_{i=1}^{N} \sin\phi i$$

$$m_1 = \sum_{i=1}^{N} \sin\phi i \cdot \sum_{i=1}^{N} (\sin\phi i \cdot \cos\phi i) - \sum_{i=1}^{N} \sin^2\phi i \cdot \sum_{i=1}^{N} \cos\phi i$$

$$m_3 = N \sum_{i=1}^{N} \sin^2\phi i - \left(\sum_{i=1}^{N} \sin\phi i\right)^2$$

and N represents the number of phase shifts.

In so doing, the intensity values (Ii) and the values of the phase steps ($\psi i$) relate to the first set of video images. The value (N) indicates the number of performed phase shifts, In order to compute the unknown phase value ($\delta$) based on equation (18), it is assumed that the intensity value (Ii) measured after the i−1) phase shift is $$I_i = A + B \cos(\delta + \psi i) \quad (19)$$

where A and B represent constants. It can be shown that for N≧3 phase shifts, the phase value ($\delta$) can be computed with equation (18).

Hereinafter is a detailed description of only the first subgroup. It consists of the parallel-connected adding-/multiplying units (43a, 44a, 45a). Each of which is fed by the output of the image storage (13a) via the data path (c). The outputs of image storages (46a, 47a, 48a) are fed to the second inputs of said adding/multiplying units (43a, 44a, 45a); the computation result will later be stored in these image storages. The unit (43a) adds only the actual intensity value (I) to the value already stored in the image storage (46a). The unit (44a) multiplies the actual intensity value (I) with the cosine of the last phase step ($\psi$) computed by the host and adds that value to the value already stored in image storage (47a). Analogous thereto, the unit (45a) multiples the actual intensity value (I) with the sine ($\psi$) of the last phase step and adds that value to the value already stored in image storage (48a). The values of sine ($\psi$) and cosine ($\delta$) are fed by the host to the units (44a, 45a). The host computer itself computes these values from the quotient of the sum stored in the register (35) and the respective number of valid measured values, which can be accessed through counter (16).

After the desired number of phase shifts has been performed, the image storage (46a) contains the values ($k_1$), the image storage (47a) contains the values ($k_2$), and the image storage (48a) contains the values ($k_3$) for all image points. The values added in the image storages (46a, 47a, 48a) are fed to two additional adding/multiplying units (49a, 50a). These units (49a, 50a) together solve the equation (18) with the two image storages (51a, 52a) and a look-up table (53a) where the function values of the arc tangent function are stored. The values of the constants ($l_1$, $l_2$, $l_3$, $m_1$, and $m_3$) can be accessed via the host computer. This may be done without any delay of the rate of evaluation because these values are the same for all image points of an image. The value of the fringe phase determined in this manner is then stored in the appropriate storage place of the image storage (17a) in FIG. 3a.

The two other subgroups of the function module (D) compute, in an analogous manner, the fringe phases ($\delta_2$, $\delta_3$) of the patterns projected at different angles. These fringe phases are then stored in appropriate image storages (17b and 17c, respectively).

The phase values stored in the image storages (17a-c) are then processed in a computer (19) which determines the beat frequency difference ($\Delta_1 = \delta_1 - \delta_2$ and $\Delta_2 = \delta_1 - \delta_3$). These values are required for the computation of the object distance (z) based on the formulae (11, 12, and 13), for which $\Delta_3$ is taken as the difference of $\Delta_2 - \Delta_1$.

This computer (19) is connected with a summing unit (S) (see FIG. 3b) consisting of a computing unit (20) and two RAM storages (21a and 21b). These storages (21a and 21b) add the phase differences ($\Delta_1$ and $\Delta_2$) for each image point. This may be done by integral arithmetics in such a manner that the 8-bit input values of the signals representing the phase differences ($\Delta_1$ and $\Delta_2$) are added in a data range of 16 bits by the storages (21a and 21b). In this manner it is possible to average the differences ($\Delta 1$, $\Delta 2$) obtained from 255 measurements by performing a summation and thus improve the accuracy of the phase measurement.

The outputs of the image storages (21a and 21b) are fed to two adjacent additional computing units (22a and 22b) where the formulae for computing the object distance based on the equations (14 and 15) are available via additional look-up tables. These computing units (22a and 22b) compute two values for the object distance (z) which are again averaged in a subsequent computing stage (23). A subsequent digital signal processor (24) computes the coordinates (x and y) of the image points in accordance with the equations (16 and 17) from the values measured for (z) and the apparatus constants (xk, yk, and ak) provided by the host computer and feeds them to an output unit (25). This method thus obtains absolute height information about the object to be measured and not only the modulo $2\pi$ value of the fringe phase.

The inventive analytical method requires that the signals generated by the camera (K) be generated in the linear range of the camera characteristic and that, in particular, there is no inadequate or excessive control. Furthermore, this method requires that a phase value be processed only when the phase values of a sequence consisting of one recording per direction of projection are valid in the appropriate image point. These computation operations are performed by the circuit element (C) in FIG. 3a. One bit of the look-up tables (LUT) of the computing unit (15) is accessed to determine whether a measured value is valid or invalid. The "AND" link among all the video images is generated together with a recursively connected RAM component (27) in the computing unit (26). The subsequent computing unit (28) computes the number of valid measured values for each image point and stores them in a subsequent RAM component (29). The number of measured values, in this case, is defined in terms of the number of video images over which the phase differences are added in the summer (S) of FIG. 3b. If a suitable limit is selected to define a minimum number of valid measurements for each image point, all other image points that give a number of valid measurements below this limit are not taken into consideration, and all other remaining image points are considered in the computation of the result. The data mask defined in this way is placed on the image points and symbolized by the box (30). The video monitor (42) used for the output can be blanked at the relevant image point locations.

The analytical computer hardware illustrated in FIGS. 3a–c represents a solution that can be used to process the camera-recorded signals by implementing the inventive method. By this solution the fringe patterns are projected sequentially by time-division multiplexing of three projectors ($P_1$, $P_2$, and $P_3$), and the images are recorded sequentially by the camera (K) and then processed. However, it is also possible to project the grating patterns, e.g., in different colors, at the same time, and record them simultaneously with cameras separated by color separators. For this, however, the input channel, i.e., the A/D converter (12), the convolution components (14a and 14b), and the time-division multiplexing computing units (15 and 16) must be configured in the appropriate number of three parallel-connected units each. This increases the costs, but offers a greater processing frequency bandwidth. Conversely, the described computing operations can be run on an appropriately programmed, suitably efficient, conventionally configured sequential computer; however, this requires considerably longer running times that preclude real time processing of video signals.

The function module (D) performs a correction computation in order to compute the fringe phases of several phase-displaced patterns. The number of phase shifts may be any number greater than 3. However, at least three phase steps must exist, whereby none is an integral multiple of the fringe period, inasmuch as otherwise the system of equations cannot be solved. The probability that at least three such phase steps are available increases significantly with the number of phase shifts. Moreover, the statistical certainty of the determined fringe phases rises with the number of evaluated phase steps.

In the described and illustrated preferred embodiment, the camera has a sensor (K) with 512×512 pixels. The intensity values of each camera pixel are digitized in the A/D converter (12) to result in an 8-bit data width. In accordance with this, the register (35), where the added differences of the phase-displaced patterns relative to the camera are stored, is designed as at least a 26-bit register. In the ideal case, when all measured values of the video images are valid, $2^{18}$ phase differences may be averaged. The resultant mean value is statistically more accurate than any individual phase difference by one factor of 512. As a result of this averaging, the value of the phase steps required for correction equation based on the equation (18) are at $2\pi/10,000$ and therefore highly accurate.

In the preferred embodiment, each projector has its own light source ($L_1$ through $L_3$). However, it is also possible to feed the light of a single light source sequentially to the projectors via appropriately controlled optical directional coupling.

Although the inventive method has been explained by using the example of topographic measurement with projected grating patterns, these represent only one possibility of implementing this method. In particular, the inventive method is also suitable for the interferometric evaluation of brightness patterns. As indicated above, phase steps ($\psi i$), which are a function of the lateral location coordinates (x, y), may also occur when interferometric fringe patterns are analyzed. These phase steps may be expressed as polynomials of a higher order $$\psi i(x, y) = ai + bi\, x + ci\, y + \text{(terms of a higher order)} \qquad (20)$$

whereby
ai represents the constant phase shift, the terms bi x and ci y represent the tilting of, e.g., the reference surface. The measured intensity value Ii (x, y) results from inserting the equation (20) in the equation (19). Then the constant ai of the phase shift, as well as the coefficients bi and ci of a higher order must be determined. This may be done by the host computer such that the host computer contains polynomials of the desired order or other correcting functions adapted to the measured phase relations $\psi i$ (x, y). In so doing, the coefficients are determined with high statistical accuracy as long as the coefficients to be determined are small relative to the number of image points in a video image. The adaptation of the polynomials to the difference values has an effect equivalent to an averaging of the phase steps.

Once the coefficients of the polynomials have been determined with high accuracy, these coefficients are used for computing accurate phase steps $\psi i$ (x, y), as well as sin $\psi i$ (x, y) and cos $\psi i$ (x, y), which are then fed by the host computer to the adding/multiplying units (44a, 45a) in the function module (D) for an evaluation having high lateral resolution. Unlike grating projection, this requires discrete values sin $\psi i$ (x, y) and cos $\psi i$ (x, y) for each image point. The final measured result is the sum of the mean value of the value $\psi i$ computed as based on the equation (20), and the results of $\delta$ computed as based on the correction equation (18).

In addition to the terms of a higher order, the equation (20) may also contain terms with spatial periodicity having spatial frequencies that are low compared with that of the expected fringe pattern. Such terms are the result of, e.g., air turbulences in the optical path of the interferometer. By adapting the modified equation (20) to the measured values, the amplitudes of these spatially periodic parts are determined accurately and considered during the evaluation with high spatial resolution in accordance with equation (18). As a result of this, a high proportion of the measured values caused by air turbulences are suppressed. The evaluation of interferometric fringe patterns requires only one subgroup (43a–53a) of the function module.

We claim:

1. A method of evaluating the phase relations of several periodic brightness patterns which are recorded by a camera as individual image each formed as a plurality of individual points corresponding to individual object points and which patterns are phase shifted relative to each other by applying a phase shift between the recording of individual images, the method comprising the steps:
   a. determining, as a first step, the phase relations of the patterns discretely for individual image points of the individual images from each pattern;
   b. computing phase shifts between the recordings of the individual images relative to an initial phase relation derived from the predetermined phase relations; and
   c. determining the phase relations of the patterns in individual image points from at least three patterns of three individual images by using the computed phase shifts.

2. The method of claim 1 including determining the phase shift by means of the difference of the phase relations determined during the first step being generated in corresponding image points.

3. The method of claim 2 including averaging the differences associated with a plurality of image points.

4. The method of claim 1 wherein during said first step, the phase relations of the brightness patterns in the individual images are determined for the individual object points by convoluting the intensity values with a two-dimensional convolution function.

5. The method of claim 1 wherein, in order to determine the phase shifts during the first method step, the phase relations are approximated by means of mathematical functions.

6. The method of claim 1 wherein the phase measurement for at least two brightness patterns projected at angles relative to each other is performed separately and then the difference between the phases of the different brightness patterns is generated.

7. The method of claim 6 wherein the evaluation of the phase relation for the different brightness patterns is parallel.

8. A computer for evaluating the phase relations of several camera-recorded periodic brightness patterns with phases shifted relative to each other, said computer comprising:
   a. a first circuit system arranged for computing the phase relations of the brightness patterns in object points from individual camera images separately;
   b. a subtractor arranged for generating the difference of the phases of two brightness patterns with phases shifted relative to each other;
   c. a second circuit system arranged for computing the phase relations of the brightness patterns for individual image points of at least three video images having brightness patterns with phases shifted relative to each other; and
   d. said second circuit system being provided with the differences of the phase values generated by the first circuit system and the subtractor.

9. The computer of claim 8 including a system arranged for averaging the differences between the phase values of two brightness patterns that are moved relative to a camera over a plurality of object points.

10. The computer of claim 8 including three image storages arranged for storing images of brightness patterns that have been projected at different angles of inclination on an object, and wherein the second circuit system is provided in triplicate so that the patterns projected at different angles of inclination are evaluated in a parallel manner.

11. The computer of claim 10 including a system arranged for averaging the differences between the phase values of two brightness patterns that are moved relative to a camera over a plurality of object points.

12. The computer of claim 8 including a system for generating the difference of the phase values of the brightness patterns projected at different angles of inclination.

13. The computer of claim 12 including three image storages arranged for storing images of brightness patterns that have been projected at different angles of inclination on an object, and wherein the second circuit system is provided in triplicate so that the patterns projected at different angles of inclination are evaluated in a parallel manner.

14. The computer of claim 12 including a system arranged for averaging the differences between the phase values of two brightness patterns that are moved relative to a camera over a plurality of object points.

15. The computer of claim 8 including a masking system arranged for comparing the phase relations in the object points computed by the first circuit system with a valid value range and permitting the feeding of the data associated with one object point only when the computed phase relation is within the valid value range.

16. A system for measuring an object surface, said system comprising:
   a. a computer for controlling the measuring;
   b. at least two projectors for projecting onto said object surface at least two brightness patterns having the same spatial period;
   c. a video camera for recording said patterns;
   d. a grating jointly supported for both projectors, said grating being movable relative to the camera;
   e. at least two image storages for the temporary storage of the patterns recorded by the camera;
   f. a first circuit system for the discrete determination of the phase relations of the patterns in object points of individual video images;

g. at least two additional image storages for the separate temporary storage of the phase values computed by the first system;

h. a subtractor for generating the difference of the phase relations of two respective video images determined by the first circuit system, whereby the patterns are phase-displaced relative to the object between the recordings of the two video images;

i. a second circuit system for determining the phase relations of the patterns in the object points of at least three phase-displaced patterns of the first projector using the differences of the phase relations of these patterns as computed by the subtractor;

j. a third circuit system for determining the phase relations of the patterns in the object points of at least three phase-displaced patterns of the second projector using the differences of the phase relations of these patterns as computed by the subtractor;

k. means for generating the difference of the phase relations computed by the second and the third circuit systems and for computing the surface topography based on these differences; and l. means for displaying the computed surface topography.

* * * * *